United States Patent
Laukkanen et al.

(10) Patent No.: US 9,200,193 B2
(45) Date of Patent: *Dec. 1, 2015

(54) AGENT AND COMPOSITION FOR OILFIELD APPLICATIONS

(75) Inventors: Antti Laukkanen, Helsinki (FI); Jan-Erik Teirfolk, Turku (FI); Juha Salmela, Laukaa (FI); Martina Lille, Vantaa (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 502 days.

This patent is subject to a terminal disclaimer.

(21) Appl. No.: 13/575,135

(22) PCT Filed: Jan. 25, 2011

(86) PCT No.: PCT/FI2011/050058
§ 371 (c)(1),
(2), (4) Date: Oct. 3, 2012

(87) PCT Pub. No.: WO2011/089323
PCT Pub. Date: Jul. 28, 2011

(65) Prior Publication Data
US 2013/0035263 A1 Feb. 7, 2013

(30) Foreign Application Priority Data
Jan. 25, 2010 (FI) .................... 20100022

(51) Int. Cl.
*C09K 8/40* (2006.01)
*C09K 8/90* (2006.01)
*C09K 8/514* (2006.01)
(Continued)

(52) U.S. Cl.
CPC ... *C09K 8/90* (2013.01); *C08L 1/02* (2013.01); *C08L 1/04* (2013.01); *C09K 8/10* (2013.01); *C09K 8/40* (2013.01); *C09K 8/514* (2013.01); *C09K 8/516* (2013.01); *C09K 8/588* (2013.01); *C09K 8/70* (2013.01); *D21C 9/002* (2013.01); *C08L 2205/16* (2013.01); *C09K 2208/08* (2013.01); *C09K 2208/10* (2013.01); *Y10T 428/298* (2015.01)

(58) Field of Classification Search
None
See application file for complete search history.

(56) References Cited

U.S. PATENT DOCUMENTS 3,882,029 A   5/1975   Fischer et al.
4,629,575 A   12/1986  Weibel et al.
(Continued)

FOREIGN PATENT DOCUMENTS

CA   2710550          5/1993
WO   WO-2006/055304 A2   5/2006
WO   WO-2009/084566 A1   9/2009

OTHER PUBLICATIONS

M. Pääkkö et al.; "Enzymatic Hydrolysis Combined with Mechanical Shearing and High-Pressure Homogenization for Nanoscale Cellulose Fibrils and Strong Gels"; Biomacromolecules 2007, 8, No. 6, pp. 1934-1941.

(Continued)

*Primary Examiner* — John J Figueroa
(74) *Attorney, Agent, or Firm* — Venable LLP; Eric J. Franklin (57) ABSTRACT

An agent for oilfield applications capable of being dispersed in water is nanofibrillar cellulose. The nanofibrillar cellulose mixed in water gives shear-thinning behavior to the composition, which is pumped to a subterranean oil-containing formation to aid in oil recovery.

27 Claims, 8 Drawing Sheets (51) Int. Cl.
*C09K 8/516* (2006.01)
*C09K 8/588* (2006.01)
*C09K 8/70* (2006.01)
*C08L 1/02* (2006.01)
*C08L 1/04* (2006.01)
*C09K 8/10* (2006.01)
*D21C 9/00* (2006.01)

(56) References Cited

U.S. PATENT DOCUMENTS

| | | | |
|---|---|---|---|
| 5,207,826 A | 5/1993 | Westland et al. | |
| 6,221,152 B1 | 4/2001 | Dial et al. | |
| 6,224,663 B1* | 5/2001 | Cantiani et al. | 106/162.8 |
| 6,231,657 B1* | 5/2001 | Cantiani et al. | 106/162.8 |
| 6,348,436 B1 | 2/2002 | Langlois et al. | |
| 2001/0004869 A1* | 6/2001 | Cantiani et al. | 106/162.71 |
| 2008/0146701 A1 | 6/2008 | Sain et al. | |
| 2009/0044942 A1 | 2/2009 | Gupta | |
| 2009/0197779 A1 | 8/2009 | Jackson et al. | |
| 2010/0282422 A1 | 11/2010 | Miyawaki et al. | |
| 2013/0345416 A1* | 12/2013 | Laukkanen et al. | 536/85 |
| 2014/0058077 A1* | 2/2014 | Laukkanen et al. | 536/56 |

OTHER PUBLICATIONS

T Saito et al; "Homogeneous Suspensions of Individualized Microfibrils from TEMPO-Catalyzed Oxidation of Native Cellulose"; Biomacromolecules 2006, vol. 7, No. 6, pp. 1687-1691.
PCT/ISA/210—International Search Report—Apr. 27, 2011.
Supplementary European search report issued in counterpart European patent application EP 11 73 4416, Jul. 16, 2013.
Finnish Office Action (With Translation)—Feb. 27, 2015 (Issued in Counterpart Application No. FI 20100022).

* cited by examiner

AGENT AND COMPOSITION FOR OILFIELD APPLICATIONS

CROSS-REFERENCE TO RELATED APPLICATIONS

This application claims priority under 35 U.S.C. §119 to Finnish patent application 20100022 filed 25 Jan. 2010 is the national phase under 35 U.S.C. §371 of PCT/FI2011/050058 filed 25 Jan. 2011.

FIELD OF THE INVENTION

The present invention relates to an agent and composition for oilfield applications.

BACKGROUND OF THE INVENTION

Several compositions are widely used in oilfield applications, for example in assisting various operations which are performed for oil recovery from the ground. Examples of such compositions are various working fluids which are pumped to the ground. These fluids have water as carrier and contain dissolved and/or disperesed agents which confer the fluid suitable properties. Examples of such working fluids are drilling muds or drilling fluids, which are used in drilling a drillhole down into the ground where the drilling mud, due to its non-newtonian viscosity behaviour, more precisely its shear-thinning property, is easily pumpable at high shear rates inside the drill due to its low viscosity, but is capable of suspending solid matter (drilling cuttings) and conveying the suspended matter at low shear rates due to its high viscosity up the drill hole. These compositions usually contain polymer dissolved in water at a suitable concentration. Widely used polymers that are used for this purpose as so-called "viscosifiers" or rheology modifying agents include xanthan gum, carboxymethyl cellulose (CMC), poly(acrylamide) (PAM), and polyvinyl alcohol (PVOH).

Other compositions where the viscosity behaviour has important function are hydraulic fracturing compositions, gravel packing compositions and so-called displacement fluids for enhanced oil recovery. All these compositions use some "viscosifier" polymer as the rheology modifying agent.

Other agents that are used in compositions are sealing agents, that is, agents to control lost circulation. These are agents that, when added to fluids pumped to the ground, seal fractures and permeable formations and prevent the loss of the actual working fluid in the ground.

For example U.S. Pat. No. 6,348,436 describes a drilling fluid comprising cellulose nanofibrils which are obtained from cells consisting of at least 80% of primary walls and which are essentially amorphous. The raw material of such nanofibrils are pulp obtained from parenchymal cells, especially from vegetables, for example beetroot pulp. The nanofibrils are charged at the surface with carboxylic acids and with acidic polysaccharides either alone or as a mixture.

SUMMARY OF THE INVENTION

It is an object of the present invention to provide an agent that can be included in various compositions that can be used in various operations for extracting oil from subterranean oil-containing formations (oil reservoirs), especially in applications where the primary recovery from a well is no more possible or economically feasible. It is also an object of the invention to provide a method to be used in an oilfield for these purposes. However, the invention is not limited to these applications but the agent and composition can be used in any feasible application in an oilfield where the characteristics of the agent, especially its rheology modifying properties, prove to be useful.

The objects are attained with anagent that is nanofibrillar cellulose (NFC), which possesses many properties useful for various oilfield applications, especially for those where xanthan gum, CMC, PAM or PVOH have been used in mixture with water.

In aqueous environment the nanofibrillar cellulose (also known as microfibrillar cellulose) consists of celluose fibres whose diameter is in the submicron range. It forms a self-assembled hydrogel network even at low concentrations. These gels of nanofibrillar cellulose are highly shear thinning and thixotrophic in nature. Due to the intrinsic properties of the nanofibrillar cellulose gels, the materials also show strong aggregate suspending power.

The nanofibrillar cellulose is prepared normally from cellulose raw material of plant origin. The raw material can be based on any plant material that contains cellulose. The raw material can also be derived from certain bacterial fermentation processes. Plant material may be wood. Wood can be from softwood tree such as spruce, pine, fir, larch, douglas-fir or hemlock, or from hardwood tree such as birch, aspen, poplar, alder, eucalyptus or acacia, or from a mixture of softwoods and hardwoods. Non-wood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed. The cellulose raw material could be also derived from the cellulose-producing micro-organism. The micro-organisms can be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*.

The term "nanofibrillar cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 μm. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of microfibrillar cellulose from cellulose raw material, cellulose pulp, or refined pulp is carried out with suitable equipment such as a refiner, grinder, homogenizer, colloider, friction grinder, ultrasound sonicator, fluidizer such as microfluidizer, macrofluidizer or fluidizer-type homogenizer. In this case the nanofibrillar cellulose is obtained through disintegration of plant celluose material and can be called "nanofibrillated cellulose". "Nanofibrillar cellulose" can also be directly isolated from certain fermentation processes. The cellulose-producing micro-organism of the present invention may be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*. "Nanofibrillar cellulose" can also be any chemically or physically modified derivate of cellulose nanofibrils or nanofibril bundles. The chemical modification could be based for example on carboxymethylation, oxidation, esterification, or etherification reaction of cellulose molecules. Modification could also be realized by physical adsorption of anionic, cationic, or non-ionic substances or any combination of these on cellulose surface. The described modification can be carried out before, after, or during the production of microfibrillar cellulose.

The nanofibrillated cellulose is according to one embodiment non-parenchymal cellulose. The non-parenchymal nanofibrillated cellulose may be in this case cellulose produced directly by micro-organisms in a fermentation process or cellulose originating in non-parenchymal plant tissue, such as tissue composed of cells with thick, secondary cell wall. Fibres are one example of such tissue.

The nanofibrillated cellulose can be made of cellulose which is chemically premodified to make it more labile. The starting material of this kind of nanofibrillated cellulose is labile cellulose pulp or cellulose raw material, which results from certain modifications of cellulose raw material or cellulose pulp. For example N-oxyl mediated oxidation (e.g. 2,2,6,6-tetramethyl-1-piperidine N-oxide) leads to very labile cellulose material, which is easy to disintegrate to microfibrillar cellulose. For example patent applications WO 09/084566 and JP 20070340371 disclose such modifications. The nanofibrillated cellulose manufactured through this kind of premodification or "labilization" is called "NFC-L" for short, in contrast to nanofibrillated cellulose which is made of not labilized or "normal" cellulose, NFC-N.

The nanofibrillated cellulose is preferably made of plant material. One alternative is to obtain the nanofibrils form non-parenchymal plant material where the nanofibrils are obtained from secondary cell walls. One abundant source of cellulose nanofibrils is wood fibres. The nanofibrillated cellulose is manufactured by homogenizing wood-derived fibrous raw material, which may be chemical pulp. When NFC-L is manufactured from wood fibres, i the cellulose is labilized by oxidation before the disintegration to nanofibrils. The disintegration in some of the above-mentioned equipments produces nanofibrils which have the diameter of only some nanometers, which is 50 nm at the most and gives a clear dispersion in water. The nanofibrils can be reduced to size where the diameter of most of the fibrils is in the range of only 2-20 nm only. The fibrils originating in secondary cell walls are essentially crystalline with degree of crystallinity of at least 55%.

When dispersed in water, this type of NFC, which in the description to follow will alternatively be called "NFC-L", has excellent performance as rheology modifier, especially as viscosifier. This makes it possible to use an oilfield application composition where the NFC is dispersed in water, either alone or in mixture with some other viscosifier and/or other additives, in various fluids in an oilfield in assisting the recovery of oil form underground formations or for other operations that support the process of oil recovery. "Underground" means in this context also in the seabed, that is, offshore operations.

The high viscosity at low share rates, good pumpability at high shear rates, immiscibility with oil and good suspension capacity of solids makes the NFC of the invention, especially the NFC-L, ideal for preparing different working fluids for oil recovery or assisting operations. These fluids include:
 hydraulic fracturing fluids,
 carrier fluids for gravel packing,
 spacer fluid,
 displacement fluids, "flooding fluids" in enhanced oil recovery, —drilling fluids, and
 well completion and workover fluid (as described in U.S. Pat. No. 3,882,029 for example).

The pore blocking capability of the NFC is also useful property when a fluid containing the NFC as viscosifier is used in subterranean formations.

The invention also relates to methods of oil recovery or assisting oilfield operations where some of the above-mentioned fluids is used.

DETAILED DESCRIPTION OF THE INVENTION

The invention will be described in the following with reference to the enclosed drawings illustrating some useful properties of the agent according to the invention. In the drawings

The agent which is nanofibrillar cellulose (NFC) can be used as rheology modifier or sealing agent. It is mixed with water on the site, that is, in the oilfield, and can be transported there in a concentrated dispersion or as dry. The NFC tolerates well different water properties, such as salinity and pH over a wide range.

When used as viscosifer in the composition, the nanofibrillar cellulose (NFC), can be NFC-L which is manufactured according to the labilization method explained above. Only small amounts in water, between 0.1 and 1.0 wt-%, are sufficient for achieving a high viscose level at low shear rates and good pumpabilitys (low viscosity) at high shear rate. At low shear rates of $1 \times -4-1 \times -3$ l/s in most preferable case even over 10000 Pa.s viscosities are attainable at the concentration of only 0.5% NFC in water. Consequently, when using large volumes of fluids in oil recovery, smaller amounts of the viscosifier than before need to be transported to the site where the fluid is prepared. The fluid is normally prepared in the oilfield by dosing the viscosifier and possible additives to the water, and smaller amounts viscosifier needed reduce transport costs to oilfields.

When used as sealing agent, the nanofibrillar cellulose (NFC) may be normal grade, NFC-N, which has larger diameter and more effective pore sealing properties. It can be used in the composition together with other solid suspendible sealing agents of coarser size, such as fibres, for example fibres of conventional cellulose pulp.

In the following examples, properties of nanofibrillated cellulose (NFC-N and NFC-L) made from non-parenchymal plant material, fibres, are described. However, the invention is not limited only to the NFC from this source.

GENERAL PROPERTIES OF THE NFC

Example 1

Gel Strength

Figure 1:
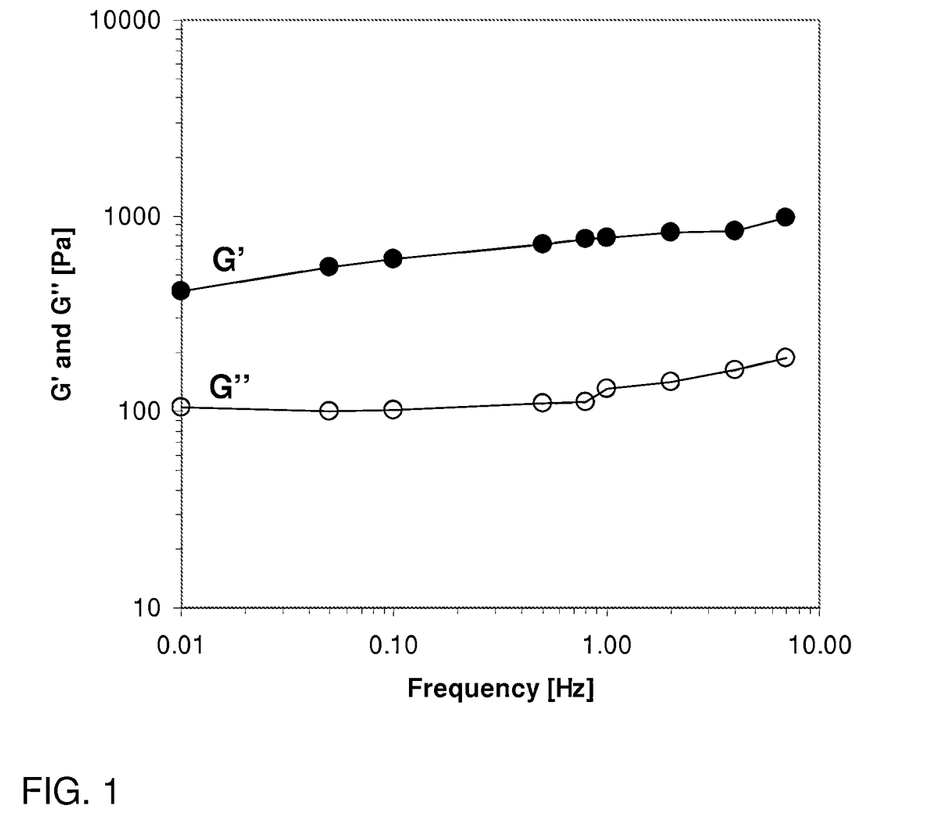
FIG. 1 is a frequency sweep graph for a NFC dispersion showing the storage and loss modulus as a function of frequency.

A gel-like behaviour at rest is crucial for optimum suspending power of fluids used in oil recovery. By using NFC in a drilling fluid a high gel strength can be obtained at low concentration as demonstrated in FIG. 1, where the storage and loss modulus of a 1.35% NFC-N dispersion are presented as function of frequency. The result was obtained with an oscillatory frequency sweep measurement in a rheometer (StressTech, Reologica Instruments Ab, Sweden) equipped with a plate-plate (diameter 20 mm, gap 1 mm) geometry. The result presented in FIG. 1 is typical for gel-like materials. G' is several orders of magnitudes greater than G", which means that elastic (solid-like) properties are more pronounced than viscous (liquid-like) characteristics. Typical for gels is also that both G' and G" are relatively independent of frequency.

Example 2

Flow Properties

Figure 2:
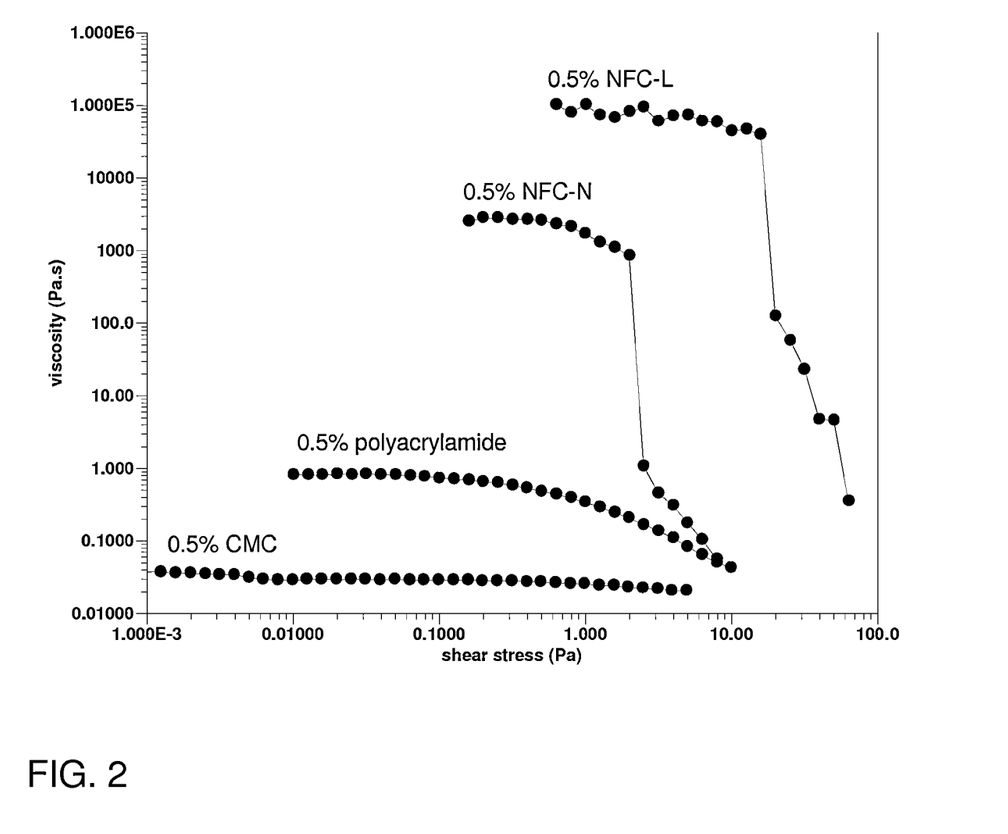
FIG. 2 shows viscosity of NFC dispersions as function of applied shear stress in comparison with polymers typically used as thickeners in drilling fluids.
Figure 3:
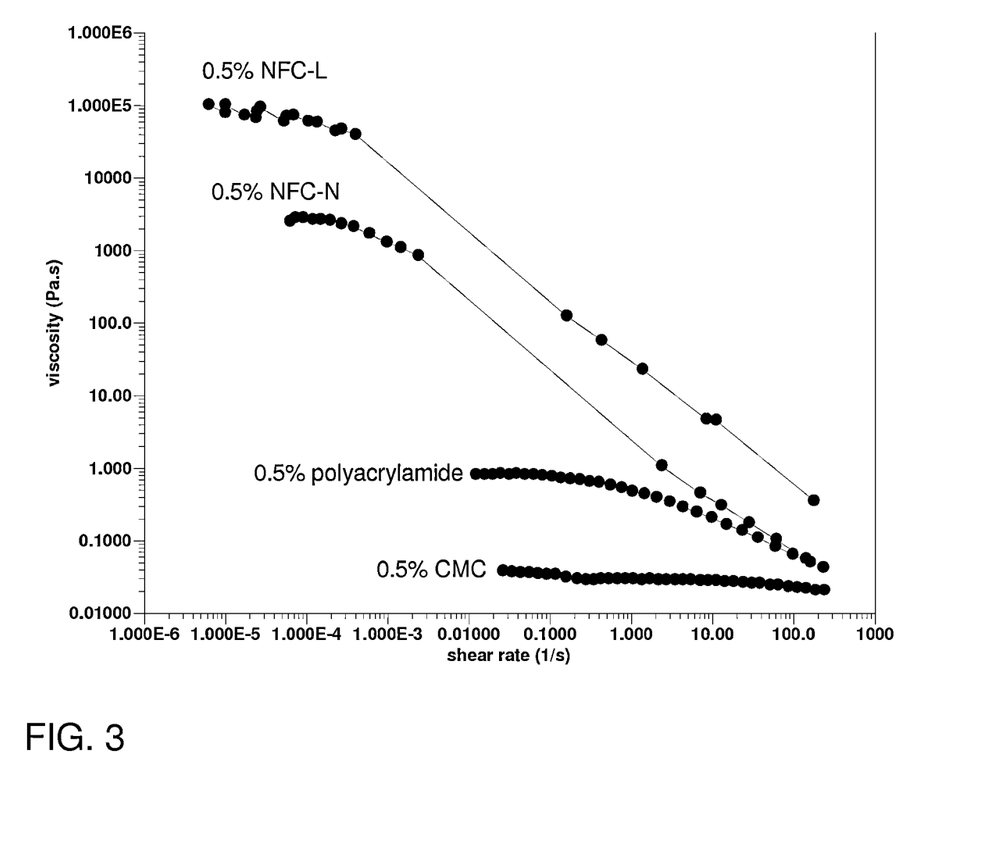
FIG. 3 shows viscosity of NFC dispersions as function of measured shear rate in comparison with polymers typically used as thickeners in drilling fluids.

The liquids used in oil recovery need to have a high viscosity at low shear (or rest) for optimum suspending capacity but also show shear-thinning behaviour at higher shear rates to facilitate pumping. The ability of NFC to provide these kinds of rheological properties was demonstrated in a test series where the viscosity of NFC dispersions was measured over a broad shear stress(rate) range in a rotational rheometer (AR-G2, TA Instruments, UK) using a vane geometry. FIG. 2 shows viscosity of 0.5% NFC dispersions as function of applied shear stress in comparison with 0.5% polyacrylamide and CMC, which are polymers typically used as thickeners in drilling fluids. NFC dispersions show much higher zero-shear viscosities (the region of constant viscosity at small shear stresses) than other polymers commonly used in drilling fluids, as shown in FIG. 2. The zero-shear viscosity of NFC is greatly increased by smaller nanofibril diameter induced by preceding labilization of the starting material, such as by a 2,2,6,6-tetramethylpiperidine-1-oxyl radical -mediated oxidation. The stress at which shear-thinning behaviour starts ("yield stress") is also considerbaly higher for the NFC dispersions than for the reference materials. The suspending ability of a material is the better the higher the yield stress. The viscosity of the NFC dispersions drops dramatically after the application of a stress higher than the yield stress. FIG. 3 presents the viscosity of 0.5% NFC dispersions as a function of measured shear rate in comparison with 0.5% polyacrylamide and CMC. From this Figure it is obvious that the viscosity of the NFC dispersions drops at relatively small shear rates and reaches a similar level as that measured for the reference materials at shear rates of about 200 $s^{-1}$.

Example 3

Structure Recovery after Shearing has Ceased

Figure 4:
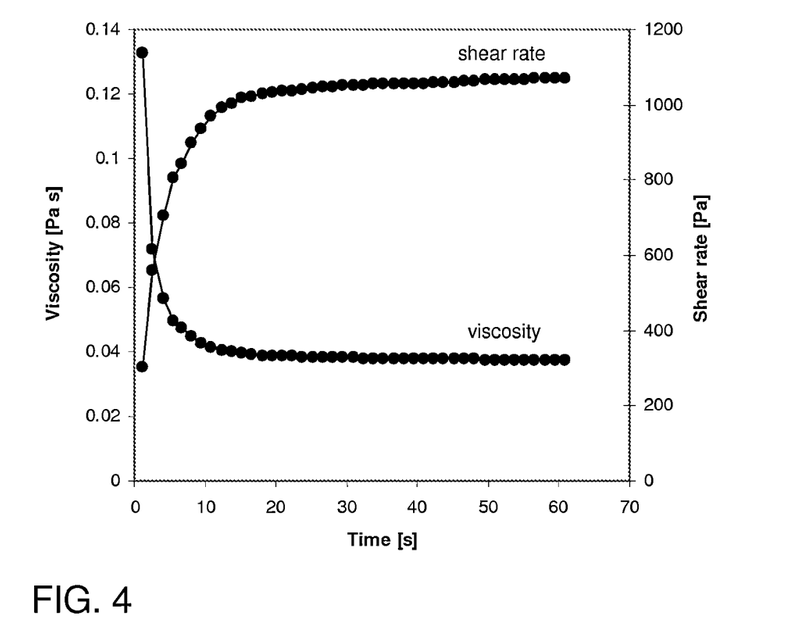
FIG. 4 shows the evolution of shear rate and viscosity during shearing of a NFC dispersion in a rheometer.

An additional important property of drilling fluids is that the high level of viscosity is retained after shearing (e.g. pumping) has ceased. The structure recovery of a NFC dispersion was demonstrated by a test series where the material was first sheared in a rheometer (StressTech, Reologica Instruments Ab) at a high shear rate and after stopping the shear the recovery of the gel strength (G') was monitored with an oscillatory time sweep measurement. The shearing cycle was performed in a concentric cylinder geometry at a constant stress of 40 Pa for 61 s. The evolution of shear rate and viscosity when a 0.7% NFC-N dispersion was sheared in the rheometer during this test is shown in FIG. 4. The material was sheared at a relatively high shear rate (1000 $s^{-1}$) for a time period of at least 40 s, during which the viscosity of the material dropped below 40 mPa s.

Figure 5:
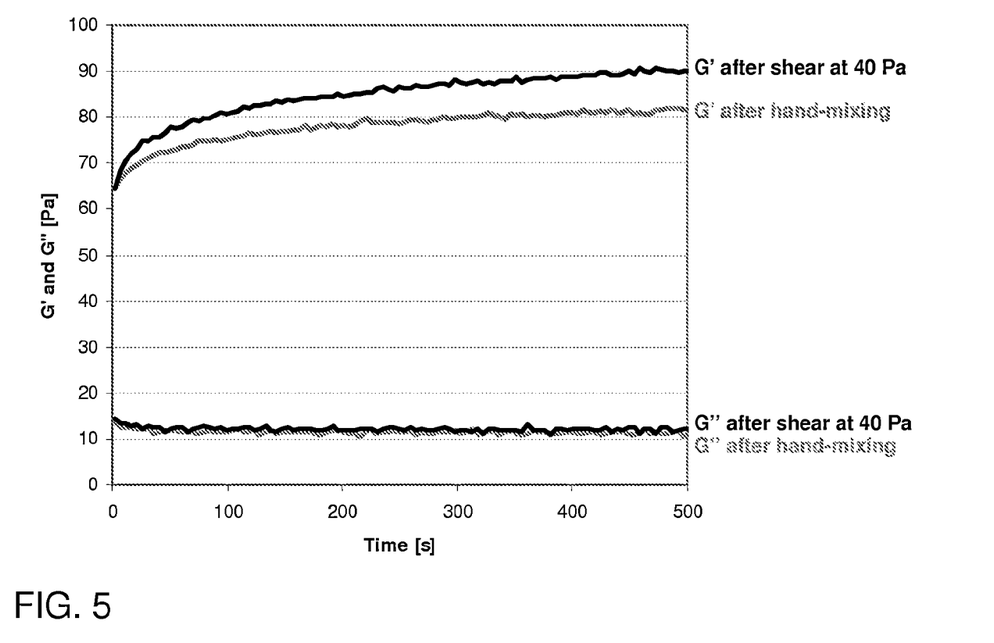
FIG. 5 shows the structure recovery of a NFC dispersion after shearing at high shear-rate.

After stopping the shear, the evolution of G' (a measure of gel strength) was followed by an oscillatory measurement at constant frequency (1 Hz) and small stress (0.5 Pa). The measurement was started exactly 10 s after the shearing was stopped. From FIG. 5, which shows the structure recovery of the 0.7% NFC-N dispersion after shearing at high shear-rate as compared with the situation after gentle mixing with a glass rod, it is obvious that a gel network is very rapidly formed when the NFC dispersion is allowed to rest after it has been sheared at high shear rates. Substantial structure recovery is observed already 10 s after the cessation of shear (equal to time zero in FIG. 5). A constant storage modulus (G') level is reached after keeping the NFC dispersion at rest for less than 10 min. The G'-level that the extensively sheared NFC dispersion developed was comparable to that of a NFC dispersion that was only gently mixed with a glass rod before the structure recovery test.

Example 4

Viscosity at High Shear Rates

Figure 6:
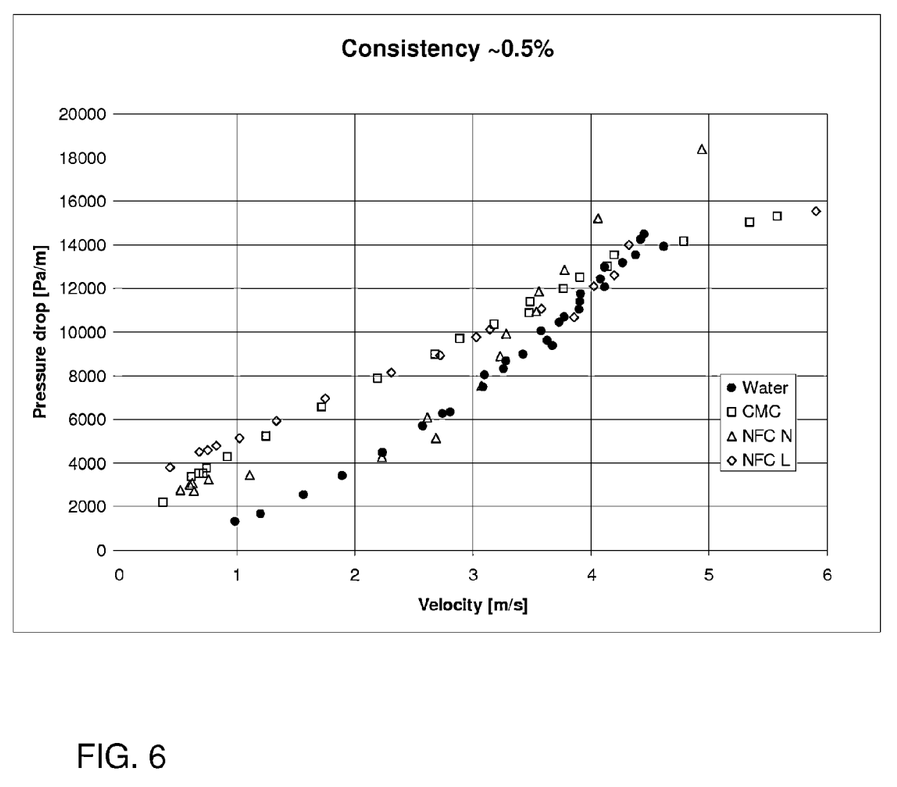
FIGS. 6 and 7 show pressure drop and calculated viscosity for three different fluids.
Figure 7:
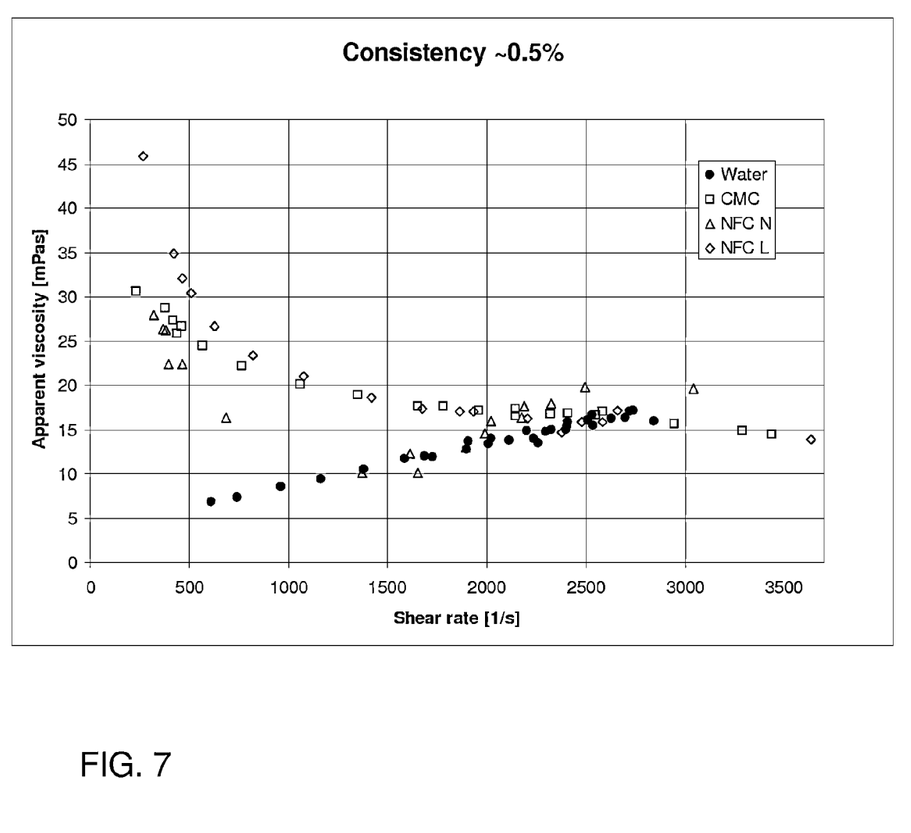

Maintaining a high shear viscosity at low shear rates and low viscosity at high shear rates enables both effective displacement of crude oil from the reservoir and at the same time low pumping costs (even lower than for pure water). In FIGS. 6 and 7 pressure drop and calculated viscosity for three different fluids are shown at approx. 0.5% consistency. The FIG. 6 shows pressure drop vs. velocity in a 13 mm diameter stainless steel pipe. The FIG. 7 shows apparent viscosity vs. shear rate, where apparent viscosity is calculated from FIG. 1 using equation 1.

These examples show that NFC-L gives lower pressure drop than pure water when the velocity is above 4 m/s. Pumping velocities in a process industry are often above this.

Changes in pressure drop are due to shear thinning behaviour of NFC and CMC fluids.

Pressure drop measurements were carried out in 13 mm diameter vertical stainless steel tube using Fisher Rosemount differential pressure transmitter. Apparent viscosity was calculated from measured pressure difference and flow rate using equation 1. The flow rate and velocity was measured using three calibrated force sensors and assuming that the density of the fluid was 1000 kg/$m^3$.

Definition of apparent viscosity is as follows. Conventionally laminar parabolic velocity profile is assumed (capillary viscometer). This will lead to the following presentation of apparent viscosity:

$$\mu_a = \frac{\tau_w}{\dot{\gamma}_a}; \tau_w = \frac{dPR}{2L}; \dot{\gamma}_a = \frac{4Q}{\pi R^3}, \quad (1)$$

where $\mu_a$ is apparent viscosity, $\tau_w$ is shear stress, $\dot{\gamma}_a$ is shear rate, dP is pressure drop, L is distance between pressure drop measurement positions, Q is flow rate and R pipe diameter.

With long pumping lines and drill holes reduced pressure drop reduces pumping costs substantially.

Example 5

Mixing

A crude oil can be extracted from a well because it is pushed out by the high pressure in the reservoir. However, in the process of the recovery the pressure decreases rapidly and the flow of oil stops. Injection of another fluid—water or carbon dioxide gas injected below or above the oil layer respectively—allows extracting more oil from the well. This is called "water flooding". In such water-flooding operations, however, an hydrodynamic instability can develop at the interface between the water and the crude oil. This instability arises generically when a less viscous fluid (water or gas) pushes a more viscous one (oil) in a porous medium. As a result of the instability "fingers" of the less viscous fluid grow in the more viscous one. These fingers become narrower as the flow through the reservoir increases. This instability limits the output of a well, because if the flux becomes too high, the fingers may reach the entrance of the well rapidly, and mainly water or gas instead of oil will be recovered. This "fingering" is called The Saffman-Taylor instability. It is drastically modified by the properties of injecting fluids. Three different causes for the modifications have been identified so far: a dynamic (and anisotropic) surface tension, a non-Newtonian shear viscosity, and an elongational viscosity. The first and the third process lead to much wider fingers, and addition of more (or less) of the additive allows one to control the finger width for a given finger velocity. Wider fingers increase the output of an oil well.

It is known that addition of NFC in to a water increases water viscosity drastically and thus "fingers" are wider or even disappear.

Example 6

As was shown in previous examples, even very dilute dispersions of NFC have a very high viscosity at low shear rates. The hydrogel structure is also recovered when shear, such as circulation, ceases. At static conditions, NFC forms a hydrogel network with high elastic modulus and exceptionally high yield stress. Due to these properties, NFC has a very high suspending power of solid particles even at very low concentration.

Figure 8:
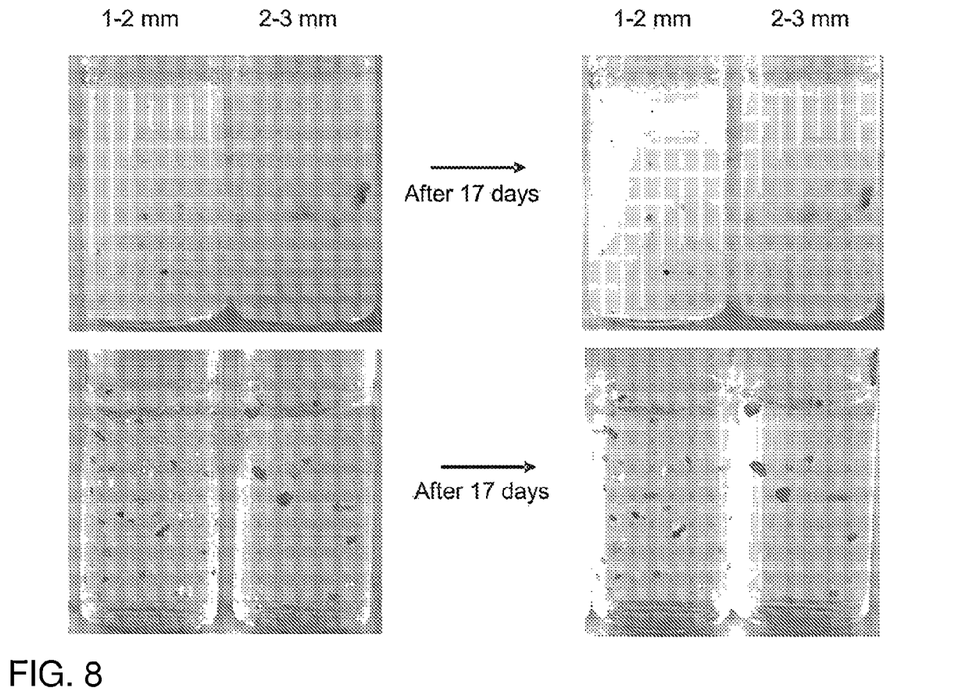
FIG. 8 shows the suspending ability of NFC dispersions with gravel suspensions.

The suspending ability at static conditions is demonstrated with gravel suspensions. 0.5% dispersions of NFC-N and NFC-L are able to stabilize even 2-3 mm size gravel particles for very long periods of time, as shown in FIG. 8. The figure shows the ability of two gravel suspensions in 0.5% NFC-N, top row and in 0.5% NFC-L, bottom row, for 17 days period. The gravel was CEN Standard sand (EN 196-1) with average particle size 1-2 mm and 2-3 mm. The samples were stored at room temperature.

It should be noted that NFC-L is able to stabilise particle suspensions at lower concentration than NFC-N.

Figure 9:
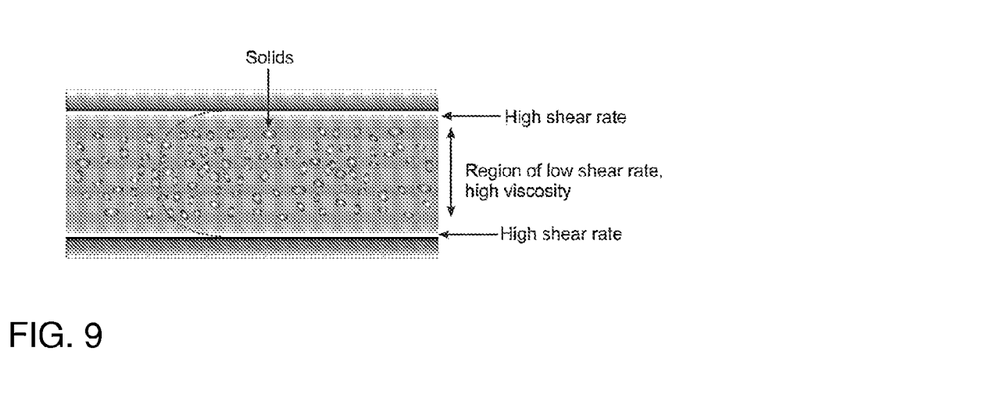
FIG. 9 is a schematic presentation of flowing NFC in an oilfield application.

In oil field application fluids, where high particle carrying capacity is needed, pseudoplasticity and suspending ability of NFC dispersion could be utilized, as shown in FIG. 9, which is a schematic presentation of the flow of a NFC-based oil field application fluid with suspended solid particles. In the middle of the annular flow profile, the shear rate is low and respectively, the viscosity is very high, which provides high carrying capacity. Close to the wall, the shear rate is high, which allows high pumping rates.

Example 7

NFC dispersions have a tendency to seal porous materials. In oil recovery fluids, the sealing property of NFC could be utilized, for example to stop loss circulation in water based fluids.

The sealing property of NFC can be easily demonstrated with a conventional Büchner vacuum filtration apparatus using filter cloths and felts with variable porosity. In the experiment, 100 g sample of 1% aqueous dispersion of NFC-N is filtered with Larox Pannevis Büchner laboratory vacuum filter. A series of Tamfelt filter cloths and felts were used, see Table 1. It was noticed that NFC migrated through the filters if the porosity was equal or higher than 20 μm. If the filter porosity was equal or less than 15 μm, the NFC formed a cake on top of the filter cloth immediately after suction. In this case, NFC content in the filtrate was 0.0%. In the cases where the NFC cake formed on the filter, the filtration took very long —typically 8-10 minutes was needed to achieve 10% solid content. Thus, water penetration through the pores is very slow after the first MFC fibrils are settled on the pores.

TABLE 1

Filter cloth and felt types used in the Büchner vacuum filtration trials and summary of the results.

| Type code of filter | Pore size (μm) | Result |
|---|---|---|
| S5111-L1 | 35 | NFC in the filtrate |
| S5118-L1 | 30 | NFC in the filtrate |
| S5118-L1K2 | 20 | NFC in the filtrate |
| S5118-L1K3 | 15 | NFC on the filter |
| S2182-L2K2 | 8 | NFC on the filter |
| S2260-L2 | 8 | NFC on the filter |
| S2181-V2L1K3 | 6 | NFC on the filter |

The sealing properties can also be adjusted. If larger cellulose fibers are mixed with NFC, also higher porosity membranes can be sealed. For example, if conventional cellulose pulp is added to 1% NFC dispersion (pulp/NFC is 10/90), 100 μm porosity filters could be sealed. Secondly, by mixing certain additives, e.g. carboxymethyl cellulose in NFC dispersion, the NFC could be forced to migrate through 6 to 8 μm filters.

Based on the sealing properties of NFC dispersions, it is clear that aqueous NFC dispersion could be utilized in oil field application fluids where sealing properties are needed. In those fluids, NFC functions as a sealing agent, a matting agent or as a bridging agent.

Uses in the Oilfield

The nanofibrillar cellulose can be transported to the site of use where it will be mixed with water. It can be transported dry or as concentrate in water. To enhance the drying, the aqueous NFC obtained after the disintegration may be mixed with and dried together with another macromolecular substance to aid in drying, for example with another rheology modifier, such as CMC. Thus, the invention encompasses also agents and compositions where the NFC (NFC-N or NFC-L) are in mixture with other rheology modifying agents.

Another alternative is to prepare nanofibrillated cellulose on the application site from raw material by disintegrating it to nanofibril-size cellulose. The NFC can be made on application site from dried or concentrated cellulose raw material or cellulose pulp which is transported to the site. According to one advantageous embodiment, the cellulose raw material or cellulose pulp is first chemically premodified to make it more labile, thereafter transported as labilized cellulose raw material or labilized cellulose pulp to the application site, and finally disintegrated on the site to form nanofibrillated cellulose (NFC-L).

The agent according to the invention (NFC-N it NFC-L), due to its properties, can be used as one component in the following fluids in oilfield applications.

Fluid for enhanced oil recovery (displacement fluid): for extracting oil from a formation by means of a composition that is pumped down an injection hole, whereafter it displaces the oil from the fromation towards a priduction well by moving towards the production well as a viscous fluid front with minimum penetration or "fingering" in the oil.

Drilling fluid: in connection with the drilling of wells for removal of drilled cuttings, suspension of high specific gravity weight material and fine cuttings, sealing of the borehole to minimize fluid losses into the formation, provision of hydrostatic head to prevent blowouts from high pressure fluids into the borehole or up through the borehole to the surface, and cooling of the drill bit and lubrication to prevent the drill pipe from sticking during rotation. The drilling fluid typically contains clay in addition to the rheology modifier.

Hydraulic fracturing fluid: for disrupting a geological structure in the formation so that new channels for oil are created. The fracturing fluid is pumped at a sufficiently high pressure and volumetric rate through a lined well hole lined down into an oil bearing zone to cause cracks to form and propagate within the surrounding geological formation. One of the components of the fluid, in addition to the rheology modifier (sometimes also called a "gellant"), is a so-called "proppant", which is a granular solid material. The fracturing fluid is transports the proppant to the cracks formed and propagated during fracturing, so that the proppant will keep the cracks open after the pressure is released. Distribution of proppant to the geological formation thus increases the permeability of the formation. The rheology modifier confers suspending capacity to the fluid so that the fluid can function as carrier for the proppant. Carrier fluid for gravel packing: in gravel packing, a tightly packed mass of solid particles is placed in the borehole and in perforations connected to the borehole so that loose subterranean formation material produced with oil is screened out by the gravel pack and is prevented from entering the wellbore. In a typical operation, a tubular gravel pack screen is first placed in the borehole adjacent the perforations therein and then the carrier fluid having the pack material of solid particles suspended therein is pumped into the space between the exterior of the screen and the walls of the borehole containing the perforations. After the carrier fluid has been screened out, the pack material is left in the perforations and in the annular space between the screen and the borehole walls. In an alternative technique, a carrier fluid-pack material suspension is pumped into the borehole and into the perforations, whereby the perforations are packed. Thereafter the tubular screen is placed and the annulus between the exterior of the screen and the brehole walls is packed using the same or different carrier liquid-pack material suspension.

Spacer fluid: Spacer fluids are used in the oil industry to displace and separate different fluids in a wellbore. Their purpose is to minimize the contact or mixing of the two fluids. These applications include: separating cement from drilling fluids; displacing drilling fluids with brine waters; separating oil-based drilling fluids from water-based drilling fluids; recovering expensive oil-based fluids and brine waters; preventing dilution of chemical treating solutions.

The invention claimed is:

1. An agent for oilfield applications capable of being dispersed in water, said agent comprising:
   nanofibrillar cellulose comprising predominantly non-parenchymal cellulose, wherein the nanofibrillar cellulose is made of cellulose raw material or cellulose pulp that is chemically premodified to make the cellulose raw material or cellulose pulp more labile, and wherein the nanofibrillar cellulose is a rheology modifying agent or a viscosifier, both giving a viscosity above 1000 Pa·s at shear rates of 1×E-4–1×E3 l/s when dispersed at concentration of 0.5 wt-% in water.

2. The agent according to claim 1, wherein the nanofibrillar cellulose has a fiber diameter less than 100 nm.

3. The agent according to claim 1, wherein the nanofibrillar cellulose has a fiber diameter less than 50 nm.

4. The agent according to claim 1, wherein the nanofibrillar cellulose, when dispersed at concentration of 0.5 wt-% in water, gives a viscosity above 5000Pa·s at shear rates of 1×E-4–1×E3 l/s.

5. The agent according to claim 1, wherein the nanofibrillar cellulose, when dispersed at concentration of 0.5 wt-% in water, gives a viscosity above 10000Pa·s at shear rates of 1×E-4–1×E3 l/s.

6. The agent according to claim 5, wherein the nanofibrillar cellulose at 0.5% concentration in water causes a pressure drop in a 13 mm diameter pipe which is lower that the pressure drop of a pure water when average flow velocity is above 4 m/s.

7. The agent according to claim 1, wherein the nanofibrillar cellulose, when dispersed at concentration of 0.5 wt-% in water, gives a yield stress of above 1.0 Pa.

8. The agent according to claim 7, wherein the nanofibrillar cellulose, when dispersed at concentration of 0.5 wt-% in water, gives viscosity right before yield stress of above 500 Pa·s.

9. The agent according to claim 1, wherein the nanofibrillar cellulose, when dispersed at concentration of 0.5 wt-% in water, gives a yield stress of above 10.0 Pa.

10. The agent according to claim 9, wherein the nanofibrillar cellulose, when dispersed at concentration of 0.5 wt-% in water, gives viscosity right before yield stress of above 5000 Pa·s.

11. The agent according to claim 9, wherein the nanofibrillar cellulose, when dispersed at concentration of 0.5 wt-% in water, gives viscosity right before yield stress of above 10000 Pa·s.

12. The agent according to claim 1, wherein the nanofibrillar cellulose at 0.5% concentration in water gives an apparent viscosity which is lower than the viscosity of a pure water when an average shear rate is above 2500 l/s.

13. The agent according to claim 1, wherein the nanofibrillar cellulose at 0.5% concentration in water causes a pressure drop in a 13 mm diameter pipe which is the same as the pressure drop of a pure water when average flow velocity is above 2 m/s.

14. The agent according to claim 1, wherein the nanofibrillar cellulose at 0.5% concentration in water gives an apparent viscosity which is the same as the viscosity of a pure water when an average shear rate is above 1300 l/s.

15. A composition for oilfield applications, the composition comprising:
   a carrier comprising water; and
   an agent mixed in the water possibly together with other added substances, said agent comprising nanofibrillar cellulose dispersed in the water and comprising predominantly non-parenchymal cellulose, wherein the nanofibrillar cellulose is made of cellulose raw material or cellulose pulp that is chemically premodified to make the cellulose raw material or cellulose pulp more labile, and wherein the nanofibrillar cellulose is a rheology modifying agent or a viscosifier, both giving a viscosity above 1000 Pa·s at shear rates of 1×E-4–1×E3 l/s when dispersed at concentration of 0.5 wt-% in water.

16. The composition according to claim 15, wherein the nanofibrillar cellulose is dispersed in the water in a concentration of 0.05-2.0 wt-%.

17. The composition according to claim 15, wherein the nanofibrillar cellulose is dispersed in the water in a concentration of 0.05-1.0 wt-%.

18. The composition according to claim 15, wherein the nanofibrillar cellulose has a viscosity above 10000 Pa·s at shear rates of 1×E-4–1×E3 l/s in a concentration of 0.5 wt-% in water.

19. The composition according to claim 15, wherein the nanofibrillar cellulose gives a yield stress of above 1.0 Pa in a concentration of 0.5 wt-% in water.

20. The composition according to claim 18, wherein the nanofibrillar cellulose gives a yield stress of above 10.0 Pa in a concentration of 0.5 wt-% in water.

21. The composition according to claim 19, wherein the nanofibrillar cellulose has a viscosity of above 500 Pa·s right before yield stress in a concentration of 0.5 wt-% in water.

22. The composition according to claim 20, wherein the nanofibrillar cellulose has a viscosity of above 5000 Pa·s right before yield stress in a concentration of 0.5 wt-% in water.

23. The composition according to claim 20, wherein the nanofibrillar cellulose has a viscosity of above 10000 Pa·s right before yield stress in a concentration of 0.5 wt-% in water.

24. A method in an oilfield, the method comprising:
pumping a composition comprising water as carrier and an agent mixed with water to a subterraean oil-containing formation, wherein said agent mixed with water in the composition is nanofibrillar cellulose dispersed in the water and comprising predominantly non-parenchymal cellulose, wherein the nanofibrillar cellulose is made of cellulose raw material or cellulose pulp that is chemically premodified to make the cellulose raw material or cellulose pulp more labile, and wherein the nanofibrillar cellulose is a rheology modifying agent or a viscosifier, both giving a viscosity above 1000 Pa·s at shear rates of 1×E-4–1×E3 l/s when dispersed at concentration of 0.5 wt-% in water.

25. The method according to claim 24, wherein the nanofibrillar cellulose has one or more of the following properties:
a yield stress (stress at which the shear-thinning behaviour starts) of above 1.0 Pa in a concentration of 0.5 wt-% in water, and
a viscosity of above 500 Pa·s right before yield stress in a concentration of 0.5 wt-% in water.

26. The method according to claim 24, wherein the nanofibrillar cellulose has one or more of the following properties:
a viscosity above 10000 Pa·s at shear rates of 1×E-4–1×E3 l/s in a concentration of 0.5 wt-% in water,
a yield stress (stress at which the shear-thinning behaviour starts) of above 10.0 Pa in a concentration of 0.5 wt-% in water, and
a viscosity of above 5000 Pa·s right before yield stress in a concentration of 0.5 wt-% in water.

27. The method according to claim 24, wherein the composition is used as
hydraulic fracturing fluid,
carrier fluid for gravel packing,
spacer fluid,
displacement fluid in enhanced oil recovery,
drilling fluid,
fluid containing a sealing agent, or
workover fluid.

* * * * *